United States Patent [19]

Fujiwara et al.

[11] Patent Number: 5,037,940
[45] Date of Patent: Aug. 6, 1991

[54] WHOLLY AROMATIC COPOLYESTER

[75] Inventors: Kenichi Fujiwara; Hideo Hayashi, both of Chiba, Japan

[73] Assignee: Idemitsu Petrochemical Co., Ltd., Tokyo, Japan

[21] Appl. No.: 524,990

[22] Filed: May 18, 1990

[30] Foreign Application Priority Data

May 24, 1989 [JP] Japan .................................. 1-128756

[51] Int. Cl.⁵ ...................... C08G 63/02; C08G 63/18; C08G 63/18
[52] U.S. Cl. ...................................... 528/193; 528/176
[58] Field of Search ................................ 528/176, 193

[56] References Cited

U.S. PATENT DOCUMENTS 4,614,790 9/1986 Hutchings et al. ................. 528/191
4,614,791 9/1986 Hutchings et al. ................. 528/193

Primary Examiner—Harold D. Anderson
Assistant Examiner—T. Mosley
Attorney, Agent, or Firm—Antonelli, Terry, Stout & Kraus

[57] ABSTRACT

A wholly aromatic copolyester, comprising; the structural units I, II, and III represented by the following formulas,

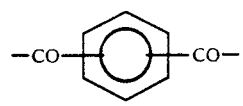

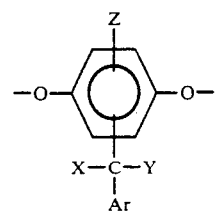

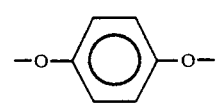

wherein
in the structural unit I, the two carbonyl groups are present on the benzene ring at the meta- or para-position to each other and
in the structural unit II, Ar is an aryl group, each of X and Y independently is hydrogen or an alkyl group of 1 to 3 carbon atoms, and Z is hydrogen or a halogen, the molar ratio of the structural unit III to the structural unit II (III:II) being from 26:74 to 60:40.

The wholly aromatic copolyester exhibits well-balanced characteristics in moldability, heat resistance, solvent resistance, and heat stability, and is useful especially as the material for electric or electronic parts and car parts.

6 Claims, No Drawings

WHOLLY AROMATIC COPOLYESTER

BACKGROUND OF THE INVENTION (a) Field of the Invention

The present invention relates to a novel, liquid-crystalline, wholly aromatic copolyester which exhibits well-balanced characteristics in moldability, heat resistance, solvent resistance, and heat stability, and can by synthesized by using relatively low-priced monomers. More particularly, the present invention relates to a novel, wholly aromatic copolyester the molding temperature and the heat resistance of which can be adjusted in specific ranges so as to make it applicable, in a form of engineering plastic, fiber, film, sheet, etc., to various fields including electrical or electronic parts and car parts.

(b) Description of the Related Art

In recent years, liquid-crystalline, thermotropic polymers, particularly liquid-crystalline, wholly aromatic polyesters have attracted interest as thermoplastic resins having excellent mechanical strength, heat resistance, and chemical resistance, and various kinds of liquid-crystalline, wholly aromatic polyesters have actually been developed. Some examples of the liquid-crystalline, wholly aromatic polyesters thus developed include wholly aromatic polyesters disclosed in Japanese Patent Application Kokai Koho (Laid-open) No. 58-29819, Japanese Patent Application Kohai Koho (Laid-open) No. 58-45224, Japanese Patent Application Kokai Koho (Laid-open) No. 59-30821, U.S. Pat. No. 4,614,791, Japanese Patent Application Kokai Koho (Laid-open) No. 59-78232, Japanese Patent Application Kokoku Koho (Publication) No. 58-40976, Japanese Patent Application Kohyo Koho No. 61-501207, Japanese Patent Application Kokai Koho (Laid-open) No. 64-26631, and Japanese Patent Application Kokai Koho (Laid-open) No. 64-40520.

Among these polyesters, the liquid-crystalline polyesters disclosed in Japanese Patent Application Kokai Koho (Laid-open) No. 59-30821 and U.S. Pat. No. 4,614,791 consist of para-substituted aromatic dicarboxylic acid components and diol components derived from substituted hydroquinones and hydroquinone and are easy to dissolve in solvents. These liquid-crystalline polyesters, however, have a relatively low content of hydroquinone component, thereby causing a problem that molded objects are inferior in heat stability and solvent resistance. The liquid-crystalline polyester disclosed in Japanese Patent Application Kohyo Koho No. 61-501207, which consists of para-substituted aromatic dicarboxylic acid components and diol components derived from specific substituted hydroquinones, have problems that not only does it have a high melting point, but it needs expensive monomers for its preparation.

SUMMARY OF THE INVENTION

An object of the present invention is to provide a novel, thermoplastic, liquid-crystalline, wholly aromatic copolyester the moldability, heat resistance, solvent resistance, and heat stability of which are well-balanced.

Another object of the present invention is to provide a novel, thermoplastic, liquid-crystalline, wholly aromatic copolyester the melting point of which is variable by varying the ratios of copolymerized components, so that the molding temperature and the degree of heat resistance can be adjusted within a predetermined specific range.

The inventors' diligent study led them to a finding that the above-described objects are attainable by a polyester comprising an aromatic dicarboxylic acid component, a specific substituted hydroquinone, and hydroquinone in specific ratios, and they eventually accomplished the present invention on the basis of the finding.

That is, the present invention provides a wholly aromatic copolyester, comprising; structural units I, II, and III represented by the following formulas,

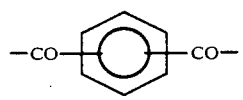

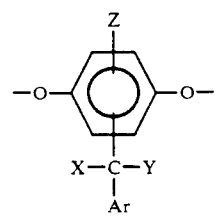

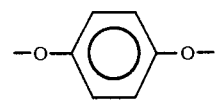

wherein
in the structural unit I, the two carbonyl groups are present on the benzene ring at the meta- or para-position to each other and
in the structural unit II, Ar is an aryl group, each of X and Y independently is hydrogen or an alkyl group of 1 to 3 carbon atoms, and Z is hydrogen or a halogen, the molar ratio of the structural unit III to the structural unit II (III:II) being from 26:74 to 60:40.

It is preferable that the structural units of the copolyester of the present invention include nothing but the structural units I, II, and III, but the copolyester may contain some other structural units as far as the accomplishment of the objects of the present invention is not hindered. In cases where other structural units are contained, the molar fraction of the total of the structural units I, II, and III in the copolyester is preferably not less than 70 mol %.

The molar ratio of the structural unit III to the structural unit II (III:II) is from 26:74 to 60:40. A molar ratio of the structural unit III to the structural unit II of smaller than 26:74 cannot solve sufficiently the problems of the homopolyester consisting of the structural units I and II that (1) the range of moldable temperature is limited due to the small difference between its flow beginning temperature (or melting point) and its mass reduction beginning temperature, (2) because of its high flow beginning temperature (or melting point), it requires high molding temperature, and (3) its small critical strain for beginning of solvent-induced stress cracking limits its use in environments where contact with solvents or chemicals is inevitable.

If the molar ratio of the structural unit III to the structural unit II is larger than 60:40, the flow beginning temperature or melting point will become higher than those of the homopolyester consisting of the structural units I and II, causing difficulty in melt molding.

The preferred molar ratio of the structural unit III to the structural unit II (III:II) is from 28:72 to 56:44.

The copolyester of the present invention may be prepared, for instance, by polycondensing (A) at least one aromatic dicarboxylic acid or a derivative thereof, (B) at least one substituted hydroquinone substituted on its nucleus with an aralkyl group or a derivative thereof, and (C) hydroquinone or a derivative thereof in a substantial molar ration A:(B+C) of 1:1.

Further, In preparation of the copolyester of the present invention, the polycondensation may be carried out in the presence of p-hydroxybenzoic acid, substituted p-hydroxybenzoic acids having substituents on their nuclei or substituted hydroquinones other than (B) having substituents on their nuclei.

The above-described polycondensation can be carried out using any method well known in preparation of polyesters. For instance, the following methods may be used.

(1) A method of using acylated derivatives of the aromatic diol compounds and using the aromatic dicarboxylic acid compounds as they are and allowing them to react with each other. Some concrete examples of the acylated derivatives include diacetyl compounds, dipropionyl compounds, and dibutyryl compounds.

(2) A method of using the aromatic diol compounds and the aromatic dicarboxylic acid compounds and allowing them to react with each other in the presence of acylating agents. In this case, the acylating agents which may be used are represented by the general formula: $R^1COOCOR^2$, each of $R^1$ and $R^2$ being an alkyl group of 1 to 3 carbon atoms.

(3) A method of allowing aryl esters of the aromatic dicarboxylic acid compounds to react with the aromatic diol compounds.

(4) A method of using the aromatic dicarboxylic acid compounds and the aromatic diol compounds and allowing them to react with each other in the presence of condensing agents such as diphenyl carbonate or derivatives thereof.

(5) A method of allowing halide salts of the aromatic dicarboxylic acids to react with the aromatic diol compounds or metal salts thereof, or allowing the aromatic dicarboxylic acids and the aromatic diols or metal salts thereof in the presence of halogenating agents to react, so that intermediate halide salts of the aromatic dicarboxylic acids react with the aromatic diols or metal salts thereof.

In every method described above, polycondensing catalysts may be used.

Herein, the word "aromatic dicarboxylic acid compound" means terephthalic acid or isophthalic acid. The preferred aromatic dicarboxylic acid compound is terephthalic acid, and when a mixture of terephthalic acid and isophthalic acid is used, it is preferable that the mixture contains not less than 90 mol % of terephthalic acid.

Herein, the word "substituted hydroquinones substituted on their nuclei with aralkyl groups" means hydroquinones substituted on their nuclei with the aralkyl group shown in the general formula II. Some illustrative examples of the substituted hydroquinones include benzylhydroquinone, α-methylbenzylhydroquinone, α, α-dimethylbenzylhydroquinone, α-ethylbenzylhydroquinone, α-butylbenzylhydroquinone, 4-methylbenzylhydroquinone, 3-methyl-α-ethylbenzylhydroquionone, 4-butyl-α-methyl-α-ethylbenzylhydroquinone, 1-naphtylmethylhydroquinone, and 2-naphtylmethylhydroquinone. Among these, the particularly preferred are those which provide the structural units II wherein Ar is phenyl group, including benzylhydroquinone, α-methylbenzylhydroquinone, and α, α-dimethylbenzylhydroquinone.

These substituted hydroquinones may be synthesized by allowing hydroquinone to react with specific compounds corresponding to the aralkyl substituent, i.e. alcohols corresponding to the aralkyl substituent or unsaturated compounds corresponding to the aralkyl substituent and having a vinyl double bond, in a proper solvent in the presence of acidic catalysts such as phosphoric acid or sulfuric acid.

The substituted hydroquinones described above may have, on their nucleus, halogen substituents, particularly chloro or bromo, in addition to the aralkyl groups.

The copolymerization using the above-described reaction materials generally is carried out at a temperature of from 100° to 400° C., preferably from 140° to 370° C., at atmospheric pressure or at reduced pressure, and it is preferable to adjust the temperature to from 230° to 370° C. and the pressure to from 300 to 0.01 Torr in the latter half stage of the copolymerization. The reaction period varies generally from several minutes to several tens hours depending on the desired melt viscosity of the resulting polymer. For the purpose of avoiding the deterioration of the generating polymer at the reaction temperature, the preferred reaction time is from several minutes to several hours.

The above-described reaction does not particularly need catalysts, but proper copolymerization catalysts, such as antimony oxide and germanium oxide, may be used.

With regard to the times for adding these reaction materials, all the reaction materials may be mixed in the first place, or each reaction materials may be added separately at various times through the copolymerization reaction. Thus, the composition distribution can be varied arbitrarily from random copolyester to block copolyester. Further, the melting point is variable by varying the composition ratios of the copolymerizing monomers, and thus, the molding temperature and the degree of heat resistance may be adjusted within a specified range.

The copolyester of the present invention can be injection molded at usual molding temperature (not higher than 400° C.), and any other molding method commonly used in molding of thermoplastic resins, such as extrusion molding, compression molding or spinning, is applicable to the molding of the copolyester.

The moldability, heat resistance, solvent resistance, and heat stability of the copolyester of the present invention are so well-balanced that the copolyester is particularly useful as the material for electric or electronic parts and car parts.

Considering the fact that the homopolyester consisting of the structural units I and III has been known as to be infusible up to 600° C. (e.g. M. J. Jackson, Jr, Macromolecules, 16, 1027 (1983), the discovery that the melting point of the homopolyester consisting of the structural units I and II is decreased by introducing the structural unit III therein in a specified ratio is one of the most important results of the present invention.

The reason for the increase of the mass reduction beginning temperature caused by introduction of the structural unit III into the homopolyester consisting of the structural units I and II may be presumed to be that the influence of the C—H bonds in the structural units II is diluted by the presence of the structural unit III.

Further, the reason for the improvement in the critical strain for beginning of solvent-induced stress cracking may be presumed to be that the free volume of the homopolyester consisting of the structural units I and II is decreased by introduction of the structural unit III, thereby reducing the velocity at which the chemical fluid is held and absorbed.

The following Examples are given to illustrate the present invention in more detail. The scope of the invention is not, however, meant to be limited to the specific details of these Examples.

EXAMPLES 1 TO 5 AND COMPARATIVE EXAMPLES 1 TO 4

EXAMPLE 1

Terephthalic acid (I-TA) 66.45 g (0.40 mol), α-methylbenzylhydroquinone (IIa) 60.00 g (0.28 mol), hydroquinone 13.20 g (0.12 mol), and acetic anhydride 81.6 g (0.80 mol) were heated to 140° C. in a 500 ml flask, and were then stirred for about one hour at 320 ppm using crescent stirring wings. Subsequently, while the mixture in the flask was being stirred continuously, the temperature was raised to 350° C. at a rate of 4° C./min, and the pressure in the reaction system was reduced to 10 Torr in five minutes. Thereafter, the mixture in the flask was stirred continuously at the same revolution for about 20 minutes, and the pressure in the reaction system was then returned to atmospheric pressure, to terminate polymerization.

The results of elementary analysis of the obtained polyester are shown below.

|  | C | H |
| --- | --- | --- |
| Calculated value (%) | 75.2 | 4.4 |
| Measured value (%) | 75.2 | 4.4 |

These results show that the obtained polyester consists essentially of the following structural units.

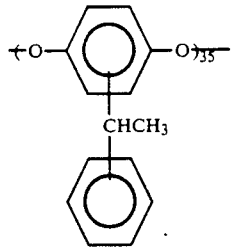

The obtained copolyester had a logarithmic viscosity number of 2.8 dl/g. The copolyester melted at 324° C. and exhibited optical anisotropy in molten state.

MEASUREMENT OF LOGARITHMIC VISCOSITY NUMBER

Relative viscosity $\eta_r$ of the copolyester was measured with an Ubbelohde's viscometer at 30° C. and at 0.5 dl/g concentration using a solvent of p-chlorophenol/-tetrachloroethane (60/40 vol %), and logarithmic viscosity number was calculated from the relative viscosity and the following formula:

$$\text{logarithmic viscosity number} = \ln\eta r/0.5 (dl/g)$$

Observation of Optical Anisotropy

Observation of optical anisotropy was conducted using a polarizing microscope with a hot-stage.

EXAMPLES 2 TO 5 AND COMPARATIVE EXAMPLES 1 TO 4

In each Examples and Comparative Examples, the procedure of Example 1 was repeated with the exception that the composition of the monomers charged was varied.

Composition of the monomers charged, the logarithmic viscosity number, flow beginning temperature or melting point, mass reduction beginning temperature, and critical strain for beginning of solvent-induced stress cracking of the polymers obtained in Examples 1 to 5 and Comparative Examples 1 to 4 are shown in Table 1.

These properties were measured as follows.

Molding of Test Pieces

Test pieces of 3.2×12×63.5 mm were molded using an injection molding machine (Trade name: MINIMAT M 5/7 produced by SUMITOMO HEAVY INDUSTRIES, LTD.).

Measuring Method

1. Flow beginning temperature

Flow beginning temperature was defined to be the temperature at which the melt viscosity measured using a Koka Type Flow Tester (produced by SHIMAZU CONSTRUCTION CO., LTD.) at a temperature raising rate of 50° C./min reached $10^3$ Pa·s.

2. Melting point

Melting point was measured at a temperature raising rate of 20° C./min using a DSC-VII produced by Perkin Elmer Co., Ltd.

3. Mass reduction beginning temperature

Measurement of mass reduction beginning temperature was conducted in air according to JIS K 7120.

4. Critical strain for beginning of solvent-stress cracking

Various strains were applied using a ¼ elliptic jig on the above-described test pieces being in a state where they were in contact with gasoline (Trade name: IDEMITSU RED APOLLO produced by Idemitsu Kosan Co., Ltd.) to cause various stresses in the test pieces, and the smallest strain required to cause stress cracking in 10 minutes was defined to be critical strain for beginning of solvent-induced stress cracking.

As apparent from the results shown in table 1, in comparison with the polyesters prepared in Comparative Examples 1 and 3, the copolyesters of the present invention could be melt-molded at lower temperatures, and had higher mass reduction beginning temperatures and superior heat stability. Further, their high critical strains prove their superiority in solvent resistance to the polyesters prepared in Comparative Examples 1 and 3.

The polyester prepared in Comparative Example 4, which contained the structural unit derived from hydroquinone in a high ratio, exhibited infusibility.

In table 1, I-TA represents terephthalic acid, IIa represents α-methylbenzylhydroquinone, IIb represents α-dimethylbenzylhydroquinone, and IIc represents benzylhydroquinone.

TABLE 1

| | Composition of copolymerizing monomers (mol %) | | | Logarithmic viscosity number | Flow beginning temperature or Melting point (°C.) | Mass reduction beginning temperature (°C.) | Critical strain for beginning of solvent-induced stress cracking (%) |
|---|---|---|---|---|---|---|---|
| | Dicarboxylic acid | Substituted hydroquinone | Hydroquinone | | | | |
| Example 1 | I-TA (50) | IIa (35) | (15) | 2.9 | 318 | 418 | 0.77 |
| Example 2 | I-TA (50) | IIa (30) | (20) | 3.7 | 310 | 421 | 0.85 |
| Example 3 | I-TA (50) | IIa (25) | (25) | 2.4 | 330 | 422 | 0.90 |
| Example 4 | I-TA (50) | IIb (30) | (20) | 3.1 | 305 | 448 | 0.78 |
| Example 5 | I-TA (50) | IIc (30) | (20) | 2.8 | 307 | 435 | 0.89 |
| Comparative example 1 | I-TA (50) | IIa (50) | (0) | 3.4 | 340 | 408 | 0.49 |
| Comparative example 2 | I-TA (50) | IIa (45) | (5) | 2.7 | 328 | 407 | 0.42 |
| Comparative example 3 | I-TA (50) | IIa (40) | (10) | 3.1 | 324 | 415 | 0.63 |
| Comparative example 4 | I-TA (50) | IIa (10) | (40) | (a) | (a) | (b) | (a) |

(a) The polyester was insoluble, infusible, and non-melt processable.
(b) Not determined.

What is claimed is:

1. A wholly aromatic copolyester, comprising; structural units I, II, and III represented by the following formulas,

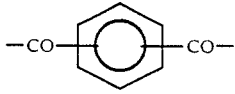

I

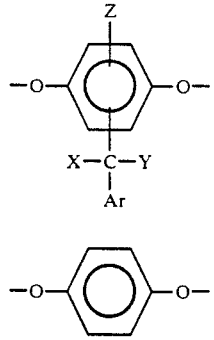

II

III wherein
in the structural unit I, the two carbonyl groups are present on the benzene ring at the meta- or para-position to each other and
in the structural unit II, Ar is an aryl group, each of X and Y independently is hydrogen or an alkyl group of 1 to 3 carbon atoms, and Z is hydrogen or a halogen,
the molar ratio of the structural unit III to the structural unit II (III:II) being from 24:76 to 60:40.

2. The wholly aromatic copolyester as claimed in claim 1, wherein the structural unit II is represented by the following formula

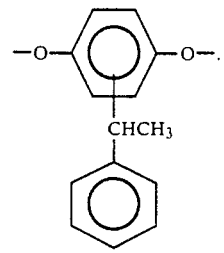

3. The wholly aromatic copolyester as claimed in claim 1, wherein the structural unit II is represented by the following formula

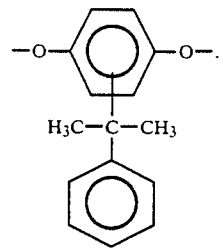

4. The wholly aromatic copolyester as claimed in claim 1, wherein the structural unit II is represented by the following formula

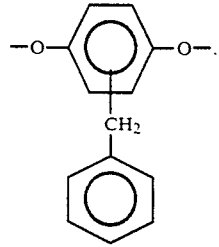

5. The wholly aromatic copolyester as claimed in claim 1, wherein the molar ratio of the structural unit III to the structural unit II (III:II) is from 28:72 to 56:44.

6. The wholly aromatic copolyester as claimed in claim 1, wherein the copolyester is prepared by polycondensing (A) at least one aromatic dicarboxylic acid selected from the group consisting of terephthalic acid and isophthalic acid, (B) at least one substituted hydroquinone selected from the group consisting of benzylhydroquinone, α-methylbenzylhydroquinone, α,α-dimethylbenzylhydroquinone, α-ethylbenzylhydroquinone, α-butylbenzylhydroquinone, 4-methylbenzylhydroquinone, 3-methyl-α-ethylbenzylhydroquinone, 4-butyl-α-methyl-α-ethylbenzylhydroquinone, 1-naphtylmethylhydroquinone, and 2-naphtylmethylhydroquinone, and (C) hydroquinone in a molar ratio A: (B+C) of 1:1.

* * * * *